United States Patent [19]

Kramer et al.

[11] 4,421,340
[45] Dec. 20, 1983

[54] COUPLING MEANS COMPRISING A CENTERING DEVICE AND A LOCKING MECHANISM FOR A MOTOR DRIVEN UTILITY UNIT HAVING A COMPLEMENTARY UNIT

[75] Inventors: Volker Kramer, Erdmannhausen; Günter Helsper, Münchingen, both of Fed. Rep. of Germany

[73] Assignee: Dr. Ing. h.c.F. Porsche Aktiengesellschaft, Stuttgart, Fed. Rep. of Germany

[21] Appl. No.: 316,533

[22] Filed: Oct. 29, 1981

[30] Foreign Application Priority Data

Nov. 8, 1980 [DE] Fed. Rep. of Germany ....... 3042160

[51] Int. Cl.³ .............................................. B60D 1/00
[52] U.S. Cl. ................................ 280/478 B; 172/275; 213/14; 280/477; 280/479 R; 280/484
[58] Field of Search ............... 280/477, 478 R, 478 A, 280/478 B, 479 R, 479 A, 474, 475, 483, 484, 504, 510, 492, 493; 172/275; 213/40 R, 40 D, 40 S, 41, 42, 43, 44, 45, 46, 50.5, 69, 64, 86, 87, 96, 98, 177, 187, 189, 190, 191, 209, 14

[56] References Cited

U.S. PATENT DOCUMENTS 2,113,542  4/1938  Dean ..................................... 213/14
4,131,295  12/1978  Highberger ..................... 280/477 X
4,284,291  8/1981  Morlok et al. .................. 280/279 R 4,346,911  8/1982  Wiese .............................. 280/478 R

FOREIGN PATENT DOCUMENTS 600955  8/1934  Fed. Rep. of Germany ...... 280/508
602520  9/1934  Fed. Rep. of Germany ... 280/478 R
2086820  5/1982  United Kingdom ........... 280/478 B Primary Examiner—Joseph F. Peters, Jr.
Assistant Examiner—Mitchell J. Hill
Attorney, Agent, or Firm—Craig & Burns

[57] ABSTRACT

A vehicle, especially an automotive utility vehicle, of the type having a motor driven vehicle unit and a towable complementary unit, such as the type utilized for fire fighting or rescue operations, is provided with an improved arrangement for coupling of the complementary unit to the vehicle unit which can be rapidly coupled to or disconnected, and which will minimize transmission of torsional forces to the vehicle frame when coupling of a vehicle that is out of alignment with the complementary unit. In accordance with a preferred embodiment, the arrangement includes a centering device that has conically surfaced members on both the vehicle and complementary unit, an elastic member which enables pivoting of the conically surfaced member of the complementary unit and its draft element during introduction thereof into the centering member of the vehicle, and a securing arrangement for firmly retaining the centering member of the complementary unit in a fully connected, rigidly coupled configuration.

15 Claims, 10 Drawing Figures

COUPLING MEANS COMPRISING A CENTERING DEVICE AND A LOCKING MECHANISM FOR A MOTOR DRIVEN UTILITY UNIT HAVING A COMPLEMENTARY UNIT

BACKGROUND AND SUMMARY OF THE INVENTION

The invention relates to a vehicle, in particular, to a motor driven utility vehicle which has a towable complementary unit having at least one wheeled axle and supporting legs. More particularly, to such a vehicle wherein the vehicle and complementary unit are coupled by way of a centering device and a locking mechanism.

In a known vehicle of the above-cited type (German Patent Application No. 1,580,019), the complementary unit has a centering device in the form of a connecting wedge which is introduced into a pocket of appropriate shape in the vehicle and secured therein by a retaining device. The disadvantage of this structure lies in the difficulty in the coupling of the complementary unit when the two vehicle components are oriented in different directions or at different angles, or when the terrain is uneven. This condition hinders the rapid coupling of the unit with the vehicle, especially in the case of units for emergency assistance, fire fighting, or the like.

Additionally, the coupling of a complementary unit to a vehicle by members in the form of truncated pyramids is known from German Patent Application No. 2,843,225 and its corresponding U.S. Pat. No. 4,284,291. This structure provides for a good coupling between the vehicle and the complementary unit, but entails the important disadvantage that, on uneven terrain or when the vehicle components are at different levels, the complementary unit cannot deviate from the vehicle, or vice versa, without direct transmission of the resulting torsional forces to the vehicle frame.

Accordingly, a principal object of the invention is to provide a vehicle with a complementary unit which can be rapidly coupled to, or disconnected from, the vehicle. A further object is to provide an improved arrangement for coupling a vehicle and a complementary unit, particularly one which will minimize transmission of torsional forces to the vehicle frame when coupling of a vehicle that is out of alignment with the complementary unit.

According to the invention, these objects are achieved in accordance with a preferred embodiment by arrangement, wherein the centering device has conically surfaced members on the vehicle and complementary unit, an elastic means is provided for enabling pivoting of the conically surfaced member of the complementary unit and its draft element during introduction thereof into the centering member of the vehicle, and a securing means for firmly retaining the centering member of the complementary unit is a fully connected, rigidly coupled configuration.

Advantageously, because the draft element is pivotably mounted in the member of the complementary unit, said element can be introduced rapidly and simply into the corresponding receiver of the vehicle. Thus, the vehicle and the complementary unit may stand at an angle or deviate from each other as determined by course differences or terrain unevenness. The complementary unit is pulled in the direction of the vehicle by the draft element which is oriented in the correct position relative to the vehicle by the locking device. The two vehicle components are securely coupled by the locking mechanism. When the vehicle and the complementary unit are in a particularly unfavorable position, the complementary unit can be pulled along with the vehicle by the draft element as a single axle trailer to favorable terrain, and then the coupling operation can be conducted. The complementary unit is pivotably attached to the vehicle by the rotatable receiver of the vehicle member, so that relative misalignment of the vehicle components can be absorbed without transmission of substantial torsional forces to the frame elements.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
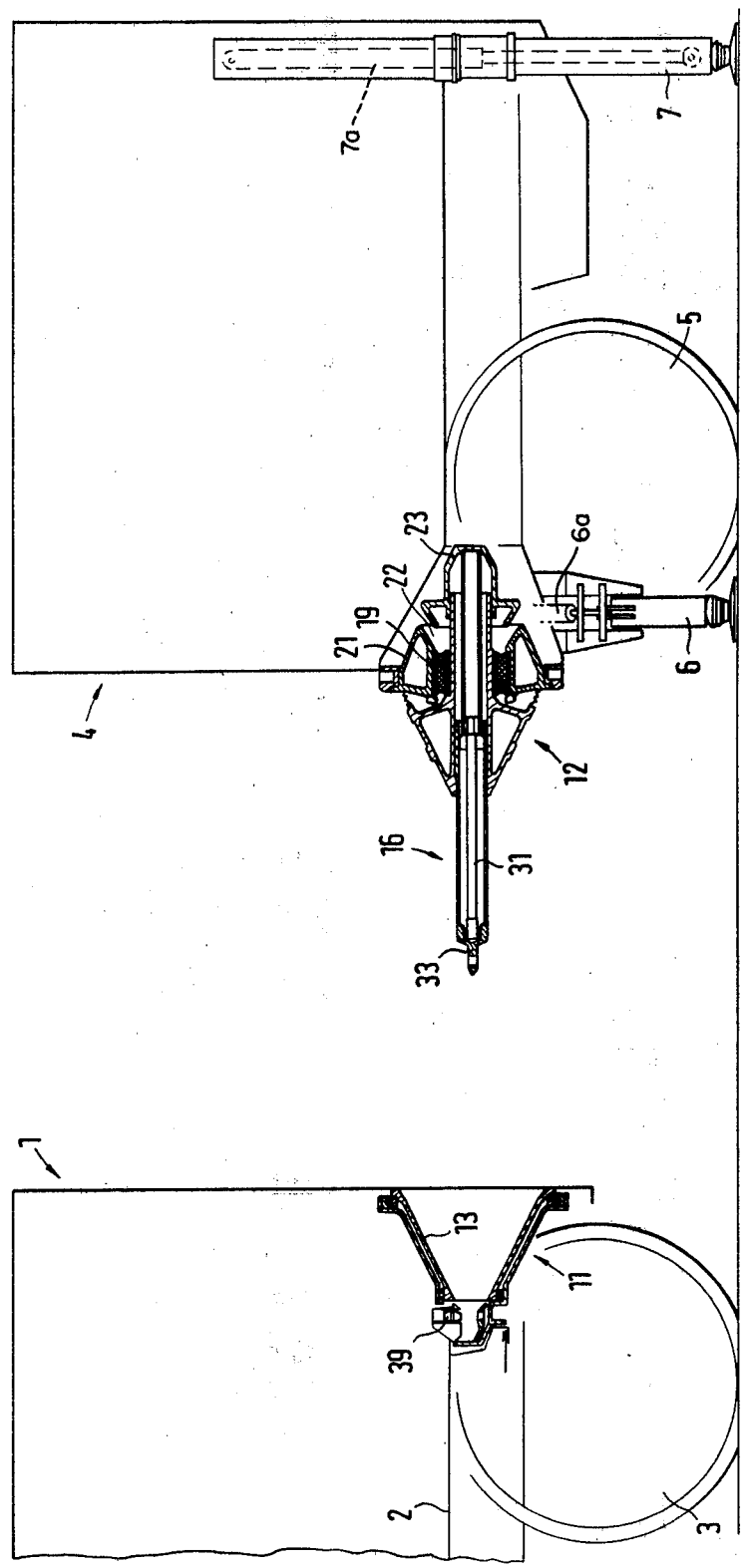
FIG. 1 is a partial side view of a vehicle and a complementary unit in accordance with the invention in an uncoupled condition.

The vehicle comprises a motor driven vehicle unit 1 having a chassis 2 and a steering system (not shown). The front axle (not shown) and the rear axle 3 are driven by a transmission (not shown) in a conventional manner. A complementary unit 4, illustrated as having a van-type body, used to transport apparatus, for example, fire fighting or rescue equipment, may be coupled to vehicle unit 1. The unit 4 comprises a wheeled axle 5 and support legs 6 and 7 which are extended and retracted by hydraulic cylinder units 6a, 7a, respectively (FIG. 1). A centering means 8, a coupling device 9, and a securing mechanism comprising a safety device 18, are used to couple vehicle unit 1 to complementary unit 4.

Centering means 8 (FIG. 2) is formed by a first mating conical surfaced centering member 11 and a second mating conical surfaced centering member 12 The first centering member 11 is disposed on vehicle unit 1 and the second centering member is disposed on complementary unit 4, in the median longitudinal plane thereof.

The first member 11 comprises a funnel-shaped receiver 13 of conical interior shape. The receiver 13 is rotatable within member 11 on bearings 14 and 15, and, thus, serves in avoiding transmission of torsional forces to chassis 2.

The second centering member 12, contains a draft element 16 (by means of which unit 4 may be coupled to and towed by unit 1) and comprises a clamping device 17, safety device 18, and an elastic means 19, formed by an elastomeric bearing sleeve in the illustrated embodiment, which permits the pivoting of draft element 16 in member 12; stopping means 43 are disposed on a retaining member 21 which grasp the element and limit the pivoting motion.

Member 12 consists of a conical front part 20 connected to retaining member 21 by the elastic means 19. Together with an end part 23 of member 12, retaining member 21 constitutes the actual clamping device 17. The retaining member 21 has a female conical funnel surface 22 in its face oriented toward end part 23. The female funnel surface 22 cooperates with end part 23 which has a male conical surface.

End part 23 is guided on a hollow shaft 24 of the front part 20 of member 12 and is longitudinally movable relative to draft element 16 against the force of a spring 25. Draft element 16 contains a hydraulic cylinder unit 27 mounted in a tube 26 which constitutes the actual draft bar. The cylinder 28 of said cylinder unit 27 is connected at 29 to the end part 23 of member 12.

The end 30 of the piston rod 31 of hydraulic cylinder unit 27 is connected to the end 32 of tube 26. The end 32 of tube 26 forms a coupling head 33 which cooperates with the coupling device 34 of the member 11 of vehicle unit 1.

Hydraulic cylinder unit 27 is arranged in, and connected to, tube 26 so that, when pressure is applied to piston 34 at 37, tube 26 is moved in direction 35 or 36 in hollow shaft 24.

Coupling head 33 is provided with an opening 37 which is engaged, in the coupled position A (FIG. 2), by a pin 39 that is operated by a hydraulic cylinder unit 38. A centering shaft 40 is used to guide head 33 as it is introduced into coupling device 9. Pin 39 has a spherical bulge (FIG. 3) over which head 33 can swing up and down, and from side-to-side, when unit 4 is towed in the FIG. 8 configuration.

Figure 3:
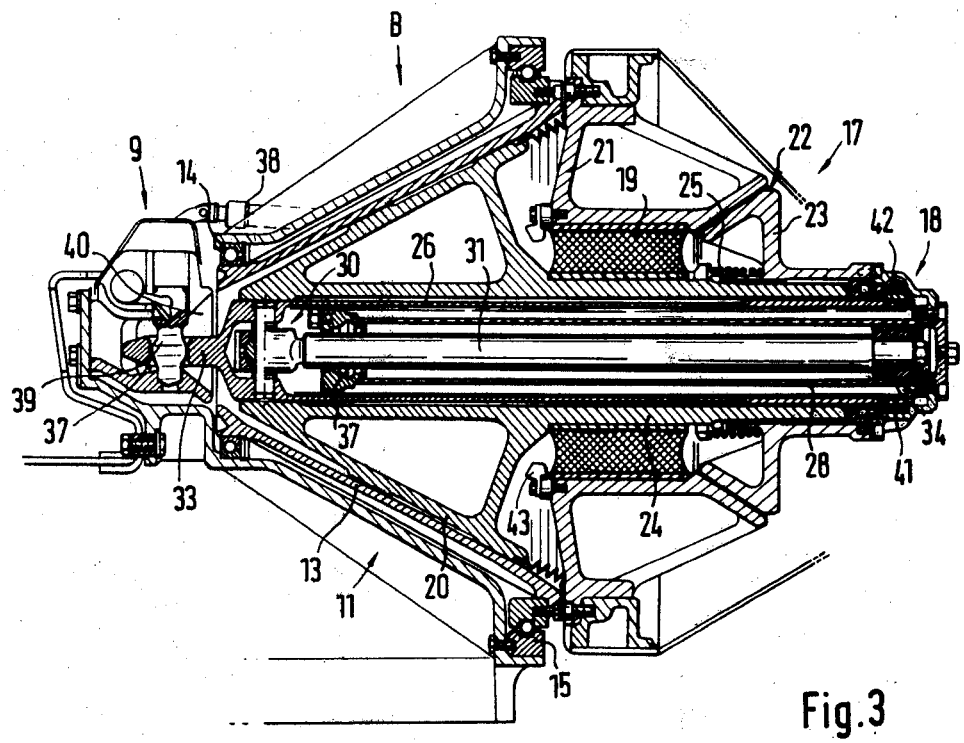
FIG. 3 is a view of the coupling arrangement of FIG. 2 in the coupled position of the vehicle and complementary unit.

When complementary unit 4 is fully connected and rigidly coupled to vehicle unit 1, tube 26 is almost totally contained in shaft 24. To maintain the coupled position B, the end of tube 26 is provided with a thread 41 which engages a locking nut 46 that is provided with an inner thread into which the thread 41 of tube 26 is threaded. Locking nut 46 externally engages a hydraulically driven rack 42, so that nut 46 may be rotated to fix the tube 26. This securing arrangement is designated generally as safety device 18 (FIG. 3). The operational steps for connecting vehicle unit 1 to complementary unit 4 is described below.

Figure 2:
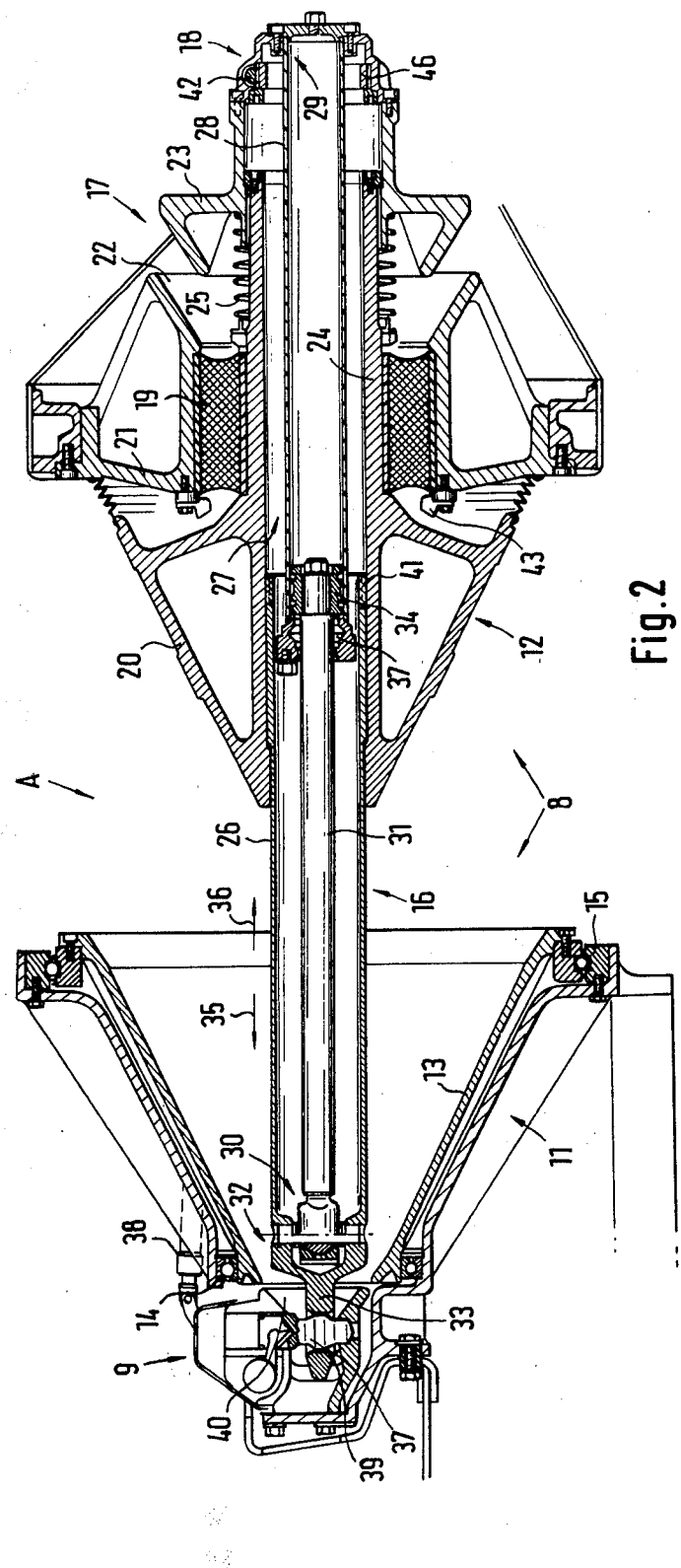
FIG. 2 is an enlarged view of the coupling arrangement of the FIG. 1 vehicle after introduction of the draft element of the complementary unit into a locking unit of the vehicle.
Figure 4:
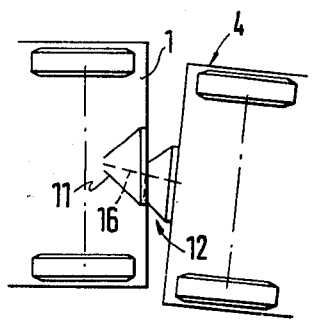
FIGS. 4 and 5 are schematic illustrations of coupling positions of a vehicle with a complementary unit which is not in alignment therewith.
Figure 5:
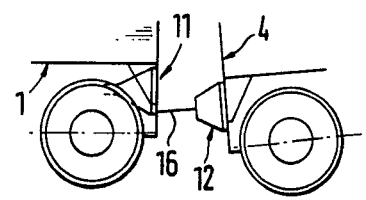
Figure 6:
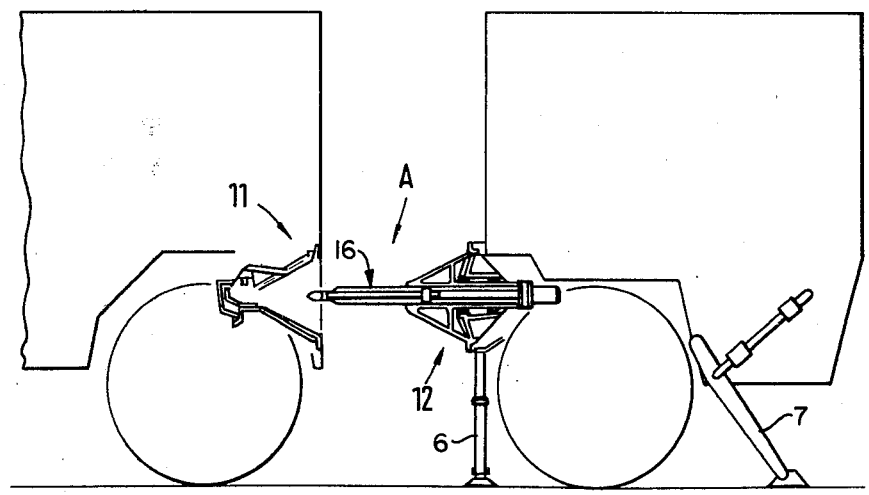
FIGS. 6–10 schematically illustrate the different positions of the coupling arrangement from the introduction step to the connection step of the complementary unit to the vehicle.
Figure 7:
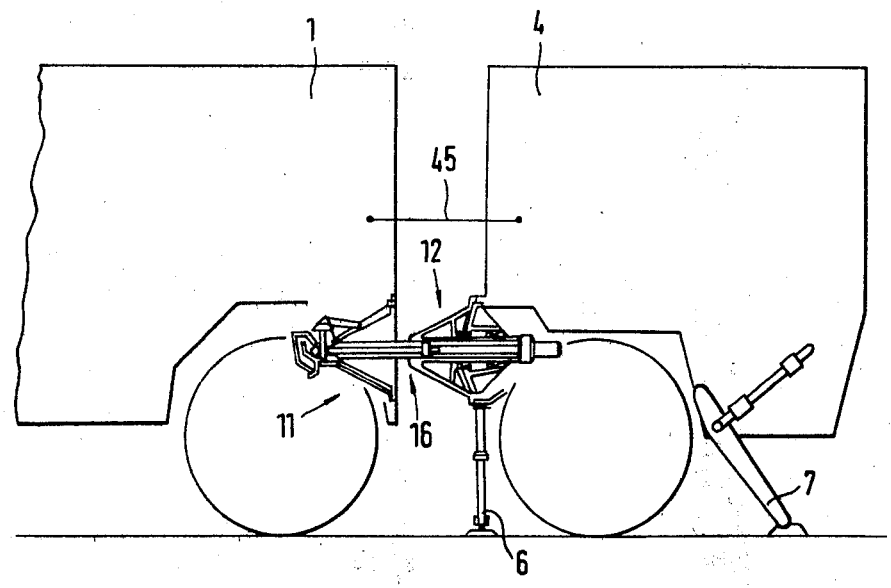

Complementary unit 4 is held in the original position by legs 6 and 7. Draft element 16 is in the extended position as in FIG. 6. Vehicle unit 1 is driven in reverse gear toward complementary unit 4 (FIG. 7). Coupling 9 is opended by raising pin 39 with hydraulic unit 38. Then, coupling head 33 is introduced through centering shaft 40 into coupling 9. Since draft element 16 or tube 26 (draft bar) is elastically mounted in member 12 by elastic bearing 19, any misalignment of the vehicle relative to complementary unit 4 can be compensated for, as shown more specifically in FIGS. 4 and 5. When correctly positioned, coupling head 33 triggers a signal which actuates the closing of coupling 9 by cylinder 38 inserting the pin 39 into opening 37. After the coupling operation has been completed, service lines 45 (for brake lights, turn indicators, etc.) are connected between vehicle unit 1 and complementary unit 4. The vehicle unit 1 and complementary unit 4 are now in a preliminarily coupled condition A (FIG. 2).

Figure 8:
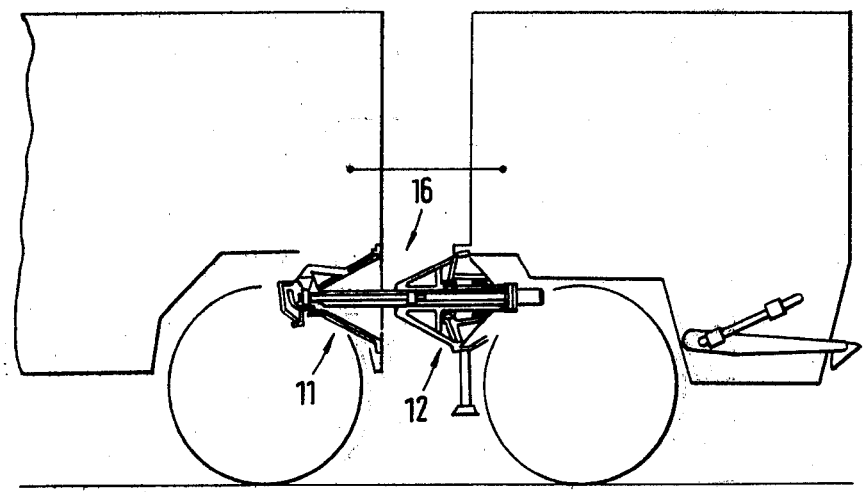

At this point, the rear support leg 7 of complementary unit 4 is hydraulically unlocked, retracted, and secured to unit 4. As a result, the complementary unit 4 will tilt backward about the wheel axle, so that the load on front support leg 6 is relieved and leg 6 can be pivoted to the transport position under unit 4 (FIG. 8).

When the difference between the orientation of vehicle unit 1 and complementary unit 4 is relatively large, the complementary unit 4 is advisably pulled to a more favorable position relative to vehicle unit 1, without attempting to complete the connection process.

Figure 9:
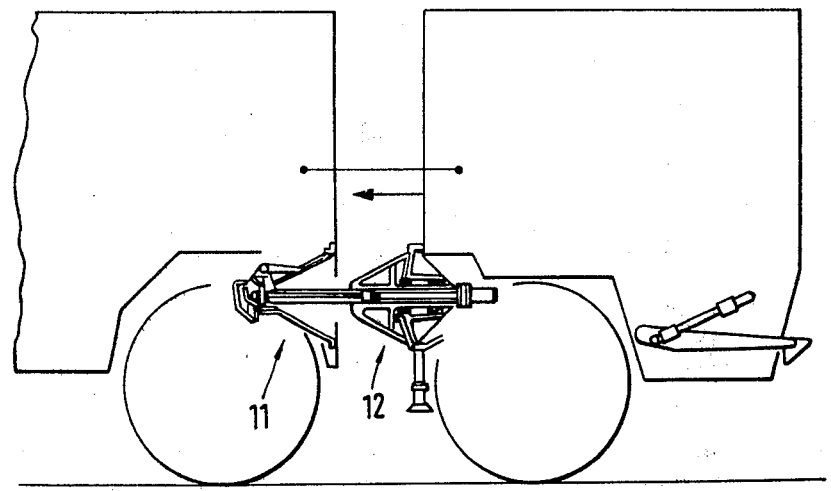

When vehicle unit 1 and complementary unit 4 are sufficiently closely aligned, preliminarily coupled unit 4 is drawn toward vehicle unit 1 (FIG. 9) by means of the hydraulic unit 27 integrated into tube 26, resulting in the male and female parts of members 11 and 12 moving to a progressively improved centering position. As a result of this drawing step, draft element 16 is rigidly secured to member 12, i.e., unit 4, since end 23 positively engages retaining member 21. Therefore, draft element 16 is no longer movable and rubber bearing 19 is relieved in all directions and, thereby, rendered inactive.

Figure 10:
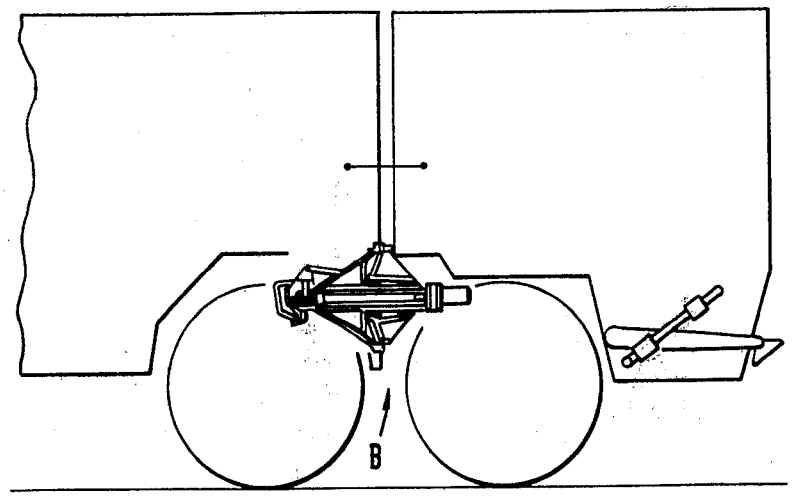

When complementary unit 4 has been drawn into its full connection position by hydraulic unit 27, it stands close to vehicle unit 1 and is exactly centered without play in the axial direction (FIG. 10). The hydraulic unit 27 holds members 11, 12 under a tension force that must be maintained when the hydraulic pressure drops. This tensional condition is maintained by the locking of the tube 26 of draft element 16 by the securing means of safety device 18. Except for relative end face stagger, vehicle unit 1 and complementary unit 4 are rigidly connected by this coupling. The stagger substantially results from receiver 13 in vehicle member 11, but the frames of vehicle units 1 and 4 are not subjected to torsional stress.

While we have shown and described a single embodiment in accordance with the present invention, it is understood that the same is not limited thereto, but is susceptible of numerous changes and modifications as known to those skilled in the art and we, therefore, do not wish to be limited to the details shown and described herein, but intend to cover all such changes and modifications as are encompassed by the scope of the appended claims.

What is claimed is:

1. A vehicle of the type having a motor driven vehicle unit and a wheeled complementary unit couplable thereto, comprising:
   (a) a towing and coupling means between the vehicle unit and the wheeled complementary unit for enabling towing of the complementary unit by the vehicle unit, and operable to draw same together, said towing and coupling means being connected, at a first end, to said complementary unit by an elastic means for enabling pivoting therof, wherein said elastic means is disposed between a retaining member and a draft element;
   (b) a locking means for securing a second, opposite end of said towing and coupling means to said vehicle unit and forming a pivotal interconnection therebetween;
   (c) drawing means mounted to said complementary unit for displacing the towing and coupling means, when it is secured to said locking means, between a first, extended, position, wherein said complemetary unit is towable behind said vehicle unit in an articulated manner and a second, retracted, position, wherein said complementary unit is drawn adjacent said vehicle unit and is towable rigidly coupled to said vehicle unit;

(d) centering means for centering said vehicle unit relative to said auxiliary hook-up unit, said centering means comprising a first and a second mating conical surfaced centering member which interengage positively, said first centering member being disposed on the vehicle unit, said second centering member being disposed on the complementary unit, said first centering member being operable to guide said towing and coupling means, and said second centering member is securable to said locking means; and (e) securing means for fixedly securing said towing and coupling means in said retracted position and for rendering said elastic means inactive, after said complementary unit has been drawn adjacent said vehicle unit.

2. The vehicle according to claim 1, wherein said drawing means comprises a hydraulic piston-cylinder unit coupled to said towing and coupling means and to said securing means.

3. The vehicle according to claim 1, wherein the securing means is comprised of the retaining member and the end part, the retaining member being provided with a conical receiver which cooperates with a correspondingly shaped conical surface of the end part in said coupled configuration of the vehicle unit and complementary unit, for rigidly connecting the front part and retaining member.

4. The vehicle according to claim 3, wherein the end part of the second centering member has a bore extending therethrough which end part cooperates with the draft element, and said end part is arranged to be longitudinally movable relative to the draft element against the force of a spring; wherein said end part is guided on a hollow shaft of the second centering member.

5. The vehicle according to claim 4, comprising the draft element having a hydraulic cylinder unit mounted in a longitudinally movable tube, and a distal end of a piston rod of the hydraulic cylinder unit disposed on the front end of the tube, wherein said front end of the tube forms a coupling head which cooperates with the coupling means of said locking mechanism which is provided in the first centering member.

6. The vehicle according to claim 4 or 5, further comprising the draft element being longitudinally movable within the hollow shaft.

7. The vehicle according to claim 6, wherein the tube of the draft element has an end part which cooperates with the coupling device of the first centering member, the first centering member includes a safety device for rigidly coupling the vehicle unit and complementary unit.

8. The vehicle according to claim 7, wherein the safety device comprises a locking nut engaging a hydraulically actuated rack, the nut being connected to the tube in said coupled configuration.

9. The vehicle as in claim 1, wherein said vehicle has a van-type body.

10. A vehicle, especially an automotive utility vehicle, comprising:

a motor driven vehicle unit, a towable complementary unit having at least one axle and support element, wherein the vehicle unit and the complementary unit are couplable by a centering means and a locking means, said centering means comprising a first and a second mating conical surfaced centering member which interengage positively, said first centering member being disposed on the vehicle unit, said first centering member comprising centering means and a receiver for the pivotable seating of said second centering member, said second centering member being disposed on the complementary unit, said second centering member comprising a conical front part and an end part disposed on a retaining member, a draft element carried by said second centering member, said draft element cooperating with a coupling device, elastic means connecting said second centering member to said retaining member, wherein said elastic means enables the conical surface and the draft element to pivot during introduction thereof into the first centering member, said elastic means being interposed between said retaining member and said draft element, securing means for firmly holding said second centering member when the complementary unit is in a fully connected, rigidly coupled configuration relative to the vehicle unit.

11. The vehicle according to claim 10 wherein the draft element has a coupling head for engaging said locking mechanism, and the centering means of the first centering member comprises a funnel-shaped centering shaft for the coupling head of the draft element.

12. The vehicle according to claim 10, further comprising stopping means on the retaining member which grasp the centering member thereto limiting pivoting of the front part of the second centering member of the complementary unit.

13. The vehicle according to claim 10, wherein the second centering member comprises a retaining member that is arranged between a conical front part and an end part thereof and said second centering member cooperates with the end part, said elastic means being interposed between said front part of said towing and coupling means and said retaining member.

14. The vehicle according to claim 10, wherein said complementary unit has a van-type body.

15. The vehicle as in claim 13, wherein said means for connecting said end part comprises a locking nut coupled to a hydraulically actuated rack and thread means formed on a tube forming a draft element of said towing and coupling means.

* * * * *